Oct. 10, 1967  E. L. HANSON ETAL  3,346,158
SPROCKET DEVICE
Filed Dec. 28, 1965
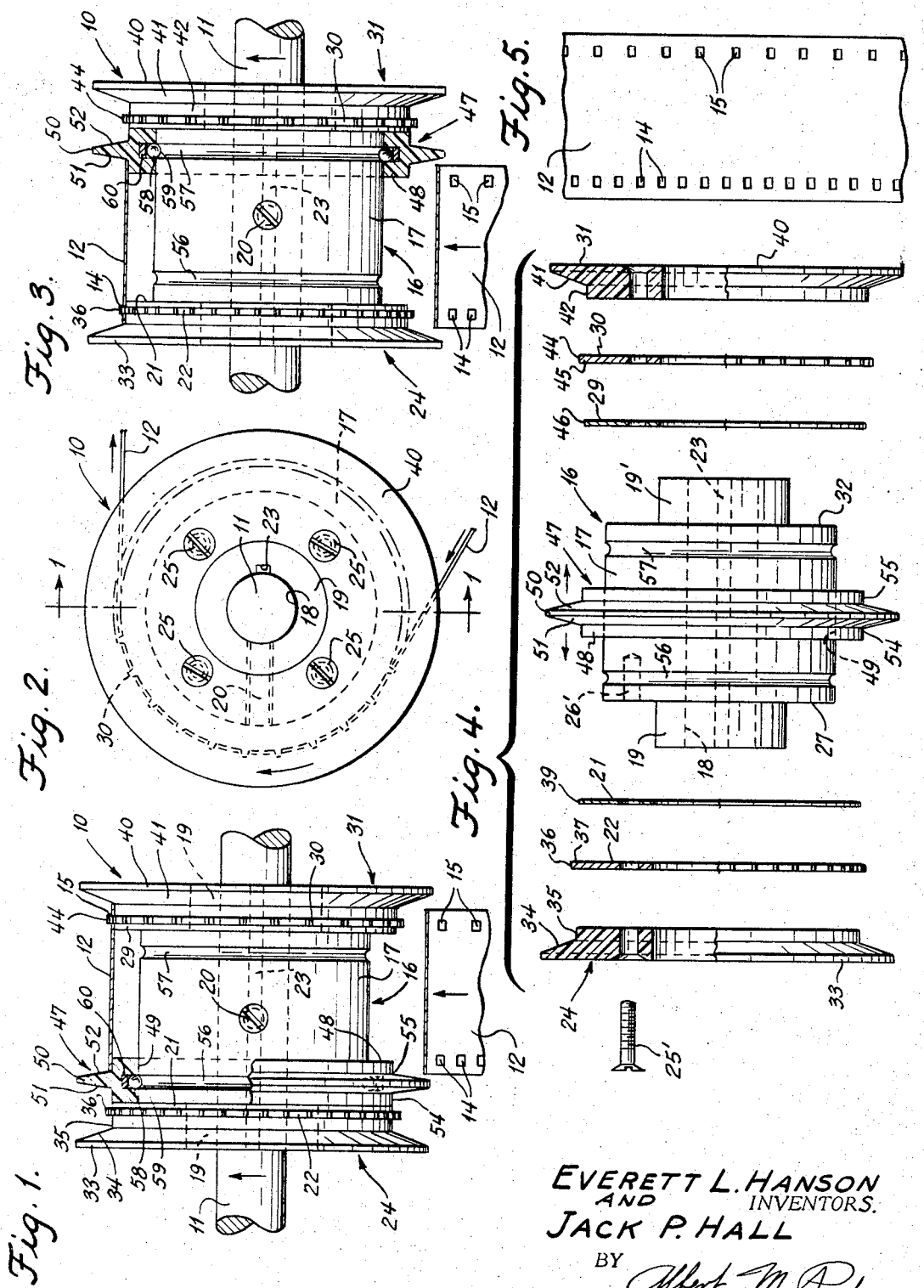
EVERETT L. HANSON
AND
JACK P. HALL  INVENTORS.
BY *Albert M. Parker*
ATTORNEY.

# United States Patent Office 3,346,158
Patented Oct. 10, 1967

3,346,158
SPROCKET DEVICE
Everett L. Hanson, Los Angeles, and Jack P. Hall, Granada Hills, Calif., assignors to De Luxe Laboratories, Inc., New York, N.Y., a corporation of New York
Filed Dec. 28, 1965, Ser. No. 516,972
8 Claims. (Cl. 226—79)

ABSTRACT OF THE DISCLOSURE

A sprocket mechanism for feeding strip material such as motion picture film having at least one row of sprocket-receiving perforations therein. The mechanism is constructed to permit the easy handling of films having two or more perforation and pitch dimensions, while still using the same standard width thread-up leader.

The sprocket mechanism is provided with end flanges, there being a first sprocket disposed adjacent and inwardly of a first flange and a second sprocket, having teeth of a different size, shape, and/or pitch from those of the first sprocket, disposed adjacent and inwardly of the second flange. A further, double-sides flange, is slidably mounted upon the body of the mechanism between the two sprockets so that such further flange guides and supports the edge of the strip material which is opposite the edge which is then engaged by a sprocket.

---

Most sprocket driven film handling machines, by virtue of their design and construction, are capable of handling films of only one standard size perforation and pitch. While sprocket devices have been proposed for film transport devices handling films having more than one perforation size and pitch, they have all failed to meet the needs of the industry, because they are either too expensive, too difficult or time-consuming to install, too complicated for reasonable maintenance, too difficult to change over, or too wasteful of space. The sprocket mechanism of the present invention is designed to obviate these difficulties and is constructed to permit the easy handling of fillms having two or more perforation and pitch dimensions, while still using the same standard width thread-up leader.

In accordance with the invention, any combination of perforation size, shape and pitch can be accommodated that will run on the sprocket device of the invention, which employs two dissimilar selectively operable sprockets. For example, the thread-up leader to be used with the sprocket of the invention could have 35 mm. perforations on one edge and 35/32 or 16 mm. perforations on the other edge. Thus, when 35 mm. film is to be transported through a given piece of equipment, the sprocket mechanism of the invention is adjusted to guide the film onto the 35 mm. sprocket and at the same time support the edge of the film opposite such sprocket. If 35/32 mm. film is directly to follow through the given equipment, the dual perforated thread-up leader is run completely through the machine. The machine is then stopped, and the sprockets are adjusted to guide the film onto the other, 35/32 mm. sprocket and at the same time support the opposite edge. Machine speed and design permitting, these changes can be effected, one sprocket at a time, while the machine is still running. By use of the sprocket mechanism of the invention, many pieces of motion picture equipment can be readily converted to multi-purpose machines.

The invention has among its objects the provision of an improved sprocket mechanism for feeding perforated strip material.

Another object of the invention is the provision of a novel sprocket mechanism which may be shifted so that sprocket means mounted on the sprocket mechanism operatively engages a selected one of two rows of perforations in the strip material.

A further object of the invention is the provision of a sprocket mechanism of the character indicated immediately hereabove, which is adapted for cooperation with strip material wherein the perforations in the two rows thereof are of different characters, as, for example, different perforation spacing, i.e. pitch.

Yet another object of the invention is the provision of a novel sprocket mechanism of the type indicated, which is particularly characterized by its simplicity of construction, its ease of being shifted between its two modes of operation, and in the illustrative embodiment, the ability thus to shift the sprocket mechanism while it is in motion.

The above and further objects and novel featuures of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view partially in side elevation and partially in vertical axial section of an illustrative embodiment of sprocket device in accordance with the invention, the section being taken along the line 1—1 of FIG. 2 looking in the direction of the arrows, the film strip being driven by the right-hand sprocket of the device as it is shown in FIG. 1;

FIG. 2 is a view in end elevation of the sprocket device, the view being taken in the direction from right to left in FIG. 1;

FIG. 3 is a view similar to FIG. 1, but with the shiftable flange of the sprocket device moved to the right from the position thereof shown in FIG. 1 and with the film strip driven by its engagement of the left-hand sprocket of the device;

FIG. 4 is an exploded view of the sprocket device of FIGS. 1, 2, and 3; and

FIG. 5 is a fragmentary view in front elevation of a section of the film strip with which the sprocket device is shown cooperating in FIGS. 1, 2, and 3.

The illustrative sprocket device of the invention, which is generally designated by the reference character 10, is shown mounted on a driven shaft 11. As the sprocket device is illustrated, the film strip 12, which in this instance is a leader strip, approaches the sprocket device from right to left along an upwardly inclined path (FIG. 2), passes partially around the sprocket device, and leaves the device in a horizontal direction from left to right. As above explained, the sprocket device may be employed in a variety of strip handling and/or processing mechanisms. It may be the only strip-forwarding means of a given mechanism, or it may be one of a plurality of serially disposed strip-forwarding means.

The film strip 12, which itself is novel, has a row of sprocket tooth-receiving holes or perforations 14 of one character along one edge thereof and a row of sprocket tooth-receiving perforations 15 of a different character along its other edge. The leader strip 12 may thus be employed as a leader for a strip of film bearing only one of the rows 14 and 15 of perforations. In the strip shown the perforations 14 are of the type designated "35 mm.," whereas perforations 14 are of the type designated "35/32 mm."

The sprocket device 10 has a body 16 which has a central circular cylindrical hub portion 17 and smaller diametered bosses 19 and 19' at the respective ends of body 17 and concentric therewith. Body 16, which may be made of strong, substantially rigid plastic material, is provided with a central circular cylindrical bore 18 therethrough which receives the shaft 11 upon which the sprocket device is mounted. In the embodiment shown, the sprocket device is fixedly held upon shaft 11 by means of a set screw 20 which extends radially inwardly of the portion 17 into engagement with the shaft 11. Alternatively, the sprocket device may be secured to shaft 11 by means of a key (not shown) which would be received within an axially extending groove in the shaft and the keyway 23 in the member 16.

The construction of the sprocket device 10 will be more readily understood by consideration of the exploded view of such device in FIG. 4. Beginning at the left-hand end of the member 16, there are fitted upon the boss 19 at such end a spacer washer 21 which may be made, for example, of plastic material, a sprocket disc 22 which may be made of metal such as stainless steel, and an end flange member 24, which may be made of a plastic material similar to that from which body 16 is made. Each of such three members is provided with an axial circular cylindrical bore which accurately receives the left-hand boss 19. Parts 21, 22, and 24 are held in face-to-face relation, with the washer 21 tight against the left-hand end surface 27 of the body 17, by a plurality (four actually employed) of machine screws 25′ which extend through aligned bores in the members 21, 22, and 24 and are threadedly reecived within tapped bores, of which one is shown at 26′, in the left-hand end surface of the body 17.

The construction of the right-hand end of the sprocket device 10 is similar to that of the above described left-hand end thereof, but for clarity different reference characters are employed to designate such parts. Thus starting from the right-hand end surface 32 of the body 17 there are mounted upon the boss 19′ at such end a spacer washer 29, a sprocket disc 30, and an end flange member 31. Members 29, 30, and 31 are retained upon the boss 19′ by means of four machine screws 25 (FIG. 2) which extend through aligned bores in the members 29, 30, and 31 and are threadedly received in tapped holes (not shown) similar to the above described holes 26′ at the left-hand end of the body 17.

The flange member 24 at the left-hand end of the sprocket device has a rim 33 having a frusto-conical inner surface 34 which converges toward the axial center of the body 16. Surface 34 terminates radially inwardly at a circular cylindrical root surface 35 above which the teeth 36 on the sprocket disc 22 protrude. Surface 35 has a diameter which markedly exceeds that of portion 17 of body 16. The root surfaces 37 between successive teeth 36 lie on the same cylinder as the surface 35. The peripheral surface 39 of the spacer washer 21 lies on the same cylinder as surfaces 35 and 37. Thus, as shown in FIG. 3, when the sprocket device 10 is employed to drive a film strip by means of the sprocket disc 22, the edge of the film strip which bears the holes receiving the sprocket teeth 36 is supported upon the surfaces 35, 37, and 39.

The flange member 31 affixed to the right-hand end of the body 16 of the sprocket device is constructed similarly to the above described flange member 24. Thus member 31 has a rim 40 having an axially inwardly converging frusto-conical surface 41 and a circular cylindrical root surface 42. The teeth 44 on the sprocket disc 30 protrude radially outwardly of the surface 42, the root surfaces 45 between successive teeth 44 lying on the same cylinder as the surface 42. The spacer washer 29 has the periphery 46 thereof lying on the same circular cylinder as surfaces 42 and 45. When the sprocket device is employed in the manner shown in FIG. 1, that is, with the film strip driven by the teeth on the sprocket disc 30, the edge of the film strip which bears the holes receiving the teeth 44 is supported by the surfaces 42, 45, and 46.

In order to provide for the support of the undriven edge of the film strip, the sprocket device 10 is provided with an intermediate flange member 47 which is slidable longitudinally of the body 17 of the device from one terminal position, shown in FIG. 1 at the left-hand end of the body 17, into another terminal position (FIG. 3) at the right-hand end of the body 17. Member 47 may be made, for example, of plastic material similar to that from which body 16 and flange members 24 and 31 are made. Member 47 has a central sleeve-like body 48 having a central bore 49 which accurately but slidably receives the outer surface of the body 17 of the device. Member 47, which is symmetrical in an axial direction, is provided with an axially central rim member 50 having a left-hand frusto-conical surface 51 and a right-hand frusto-conical surface 52 which converge in axially opposite directions. The surface 51 terminates at a circular cylindrical root 54 on the left of member 47 and the surface 52 terminates at a similar circular cylindrical root 54 at the right-hand end of body 47. In the preferred embodiment shown, root surfaces 54 and 55 lie on the same circular cylinder as the above described surfaces 35, 37, 39, 42, 45, and 46, but such surfaces 54 and 55 may, if desired, have a diameter different from that of said cylinder.

When the member 47 is in its left-hand position (FIG. 1), the left-hand end surface of its body 48 contacts the spacer washer 21. Conversely, when the member 47 is in its right-hand position (FIG. 3), the right-hand end of its body 48 contacts the spacer washer 29. In both of such positions the roots of the inclined guiding surfaces on the respective end flange and the respective side of the central slidable flange member 47 are spaced a distance which equals, with a slight plus tolerance, the width of the film strip 12.

The device 10 includes means whereby the central slidable flange member 47 is stably retained in each of its two terminal positions. In the embodiment shown, such retaining means take the form of two axially spaced annular grooves 56 and 57 which are part-circular in section. The body 48 of member 47 is provided with a plurality of angularly spaced radial bores 58 within each of which is disposed a ball 59. Disposed in such bores 58 radially outwardly of the ball 59 is a resilient insert 60 which may be made, for example, of neoprene. The relationship of the parts is such that when the flange is thrust into either of its axially terminal positions the balls 57 are thrust into the respective annular groove thus to hold the member 47 stably in such terminal position. The member 47 can, however, be slid axially of the body 16 without undue effort. When thus moved from one terminal position, the balls 59 are thrust outwardly of the groove 56 or 57, and ride along the surface of portion 17 of body 16 until the member 47 reaches its other terminal position, at which time the balls 59 fall partially into the other of such annular grooves.

The advantages of the sprocket device of the invention will be largely apparent from the above description of it. It is simple and rugged in construction, and is easily operated to shift it from one strip engaging and driving position to the other. In both of its shifted or adjusted positions, the sprocket device supports the strip of material only at its edges, the main, intermediate portion of the strip being free from contact with any portion of the sprocket device in the passage of the strip material thereabout. The main, central portion of the strip material thus cannot be scuffed by the sprocket device, which is important in the transporting of strip film.

As above indicated, the intermediate flange member 47 may be shifted from one to the other of its operative positions while the sprocket device is in operation. This may be done, for example, by forming a loop in the film strip, as by an idle roller, so as to lift the strip from engagement with the sprocket device and above the intermediate flange member 47. The member 47 can then be slid to its other operative position, following which the loop of film is shifted laterally as required, and allowed to engage the sprocket device in its new position.

The sprocket device of the invention is of advantage in that the first path of a film strip in the operation of the device, in its position shown in FIG. 1, is laterally displaced from the second path of a film strip, in the position of the device shown in FIG. 3, for a distance which is but a small fraction of the width of the film strip. This minimizes the distortion of the leader film strip 12 which occurs between successive sprocket devices when the strip 12 is temporarily running in a first path over a first sprocket device and in a second path over a second sprocket device.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A sprocket device adapted for selectively handling at least two different flexible strip materials, each of said two different strip materials having a row of sprocket tooth-receiving holes disposed longitudinally thereof, the character of the holes in one of said strip materials being different from that of the holes in the other of said strip materials, said sprocket device comprising a body in the form of a hub, a first flange fixedly mounted on the hub, a second flange fixedly mounted on the hub at a position axially spaced from the first flange, a third flange mounted on the hub between the first and second flanges for sliding axially thereof from a first position, spaced from the first flange, wherein it cooperates with the first flange in guiding a first strip of material therebetween in a first path of travel over the sprocket device, to a second position wherein it cooperates with the second flange in guiding a second strip of material therebetween in a second path of travel over the sprocket device, the said first and second paths of travel being spaced from each other axially of the hub, and two sprockets spaced axially of the hub and secured for rotation with the hub, a first one of the sprockets being positioned and having teeth interfitting with the row of sprocket receiving holes in said first one of said two strip materials in its path of travel over the sprocket device, and the second one of said sprockets being positioned and having teeth interfitting with the row of sprocket-receiving holes in the second one of said two strip materials in its path of travel over the sprocket device.

2. A sprocket device adapted for selectively handling at least two different flexible strip materials, each of said two different strip materials having a row of sprocket tooth-receiving holes disposed longitudinally thereof, the character of the holes in one of said strip materials being different from that of the holes in the other of said strip materials, said sprocket device comprising a body in the form of a hub, a first flange fixedly mounted on the hub, a second flange fixedly mounted on the hub at a position axially spaced from the first flange, two laterally spaced sprockets fixed to the hub, a first one of the sprockets having teeth adapted to interfit with the row of sprocket-receiving holes in a first one of said two strip materials, and the second of said sprockets having teeth adapted to interfit with the row of sprocket-receiving holes in the second one of said two strip materials, said first sprocket being located axially inwardly of and adjacent the first flange, said second sprocket being located axially inwardly of and adjacent the second flange, and a third flange mounted on the hub between the first and second flanges for sliding axially thereof from a first position, spaced from the first flange, wherein it cooperates with the first flange in guiding a first strip of material therebetween in a first path of travel over the sprocket device, to a second position, spaced from the second flange, wherein it cooperates with the second flange in guiding a second strip of material therebetween in a second path of travel over the sprocket device, the said first and second paths of travel being spaced from each other axially of the hub.

3. A sprocket device as claimed in claim 2, comprising means for selectively holding the third flange stably in its two operative positions.

4. A sprocket device as claimed in claim 3, wherein when it is in either of its selected operative positions the third flange lies close to a respective one of said first and second flanges.

5. A sprocket device as claimed in claim 2, wherein each of the first and second flanges has an axially inwardly facing annular root portion lying radially outwardly of the peripheral surface of the hub for supporting an edge of a strip of material, the respective sprockets are disposed axially inwardly of and close to the axially inner ends of the root portions of the first and second flanges, and the third flange has an axially outwardly facing cylindrical root portion on each side of such flange for supporting the edge of a strip of material which is opposite from the edge thereof engaged by the selected operative sprocket, the root portions of the third flange being coaxial of the root portions on the first and second flanges and each having a diameter which is the same as that of the root portion on the one of the first and second flanges which it confronts.

6. A sprocket device as claimed in claim 5, wherein the sprockets have spaced teeth projecting radially therefrom, the sprockets having a cylindrical root portion at the bases of the teeth thereon, the root portion of each sprocket lying coaxial of and at generally the same radial level as the root portion of the respective adjacent one of the first and second flanges.

7. A sprocket device as claimed in claim 5, comprising an annular disc lying axially inwardly of each of the sprockets, each of the discs being coaxially of its adjacent sprocket and having a diameter substantially equal to that of the root portion of such sprocket.

8. A sprocket device as claimed in claim 5, wherein the root portions on each of the first, second, and third flanges has the same diameter, and wherein the sprockets have the same root diameter.

References Cited
UNITED STATES PATENTS

| | | | |
|---|---|---|---|
| 1,361,919 | 12/1920 | Sommermeyer | 74—243 |
| 1,781,937 | 11/1930 | Victor | 74—243 |
| 1,880,980 | 10/1932 | Page | 74—243 |
| 2,468,025 | 4/1949 | Boecking | 74—243 |
| 2,493,612 | 6/1950 | Blanchet | 74—243 X |

FRED C. MATTERN, Jr., *Primary Examiner.*

J. A. WONG, *Assistant Examiner.*